United States Patent

[11] 3,580,100

| [72] | Inventor | Louis W. McDermott<br>c/o McDermott Ford Sales, R. R. 1,<br>Dyersville, Iowa 52040 |
|---|---|---|
| [21] | Appl. No. | 889,269 |
| [22] | Filed | Dec. 30, 1969 |
| [45] | Patented | May 25, 1971 |

[54] DRIVER TRAINING CAR THROTTLE DISCONNECT
10 Claims, 6 Drawing Figs.

[52] U.S. Cl. ............................................... 74/482
[51] Int. Cl. ......................................... G05g 11/00
[50] Field of Search ............................. 74/482, 513

[56] References Cited
UNITED STATES PATENTS
2,979,172  4/1961  Eshbaugh et al. ............. 74/482X

*Primary Examiner*—Milton Kaufman
*Attorneys*—Clarence A. O'Brien and Harvey B. Jacobson ABSTRACT: A selectively remotely actuatable control for operative connection between the throttle linkage and throttle valve control arm of an automotive carburetor including means operable, when the control is actuated, to render inoperative a normally operative motion-transmitting connection between the throttle linkage and the throttle valve control arm and return, by spring return means, the throttle valve control arm to its idle position independent of the position of the throttle linkage.

PATENTED MAY 25 1971

Louis W. McDermott
INVENTOR.

BY *Clarence A. O'Brien*
and *Harvey B. Jacobson*
Attorneys

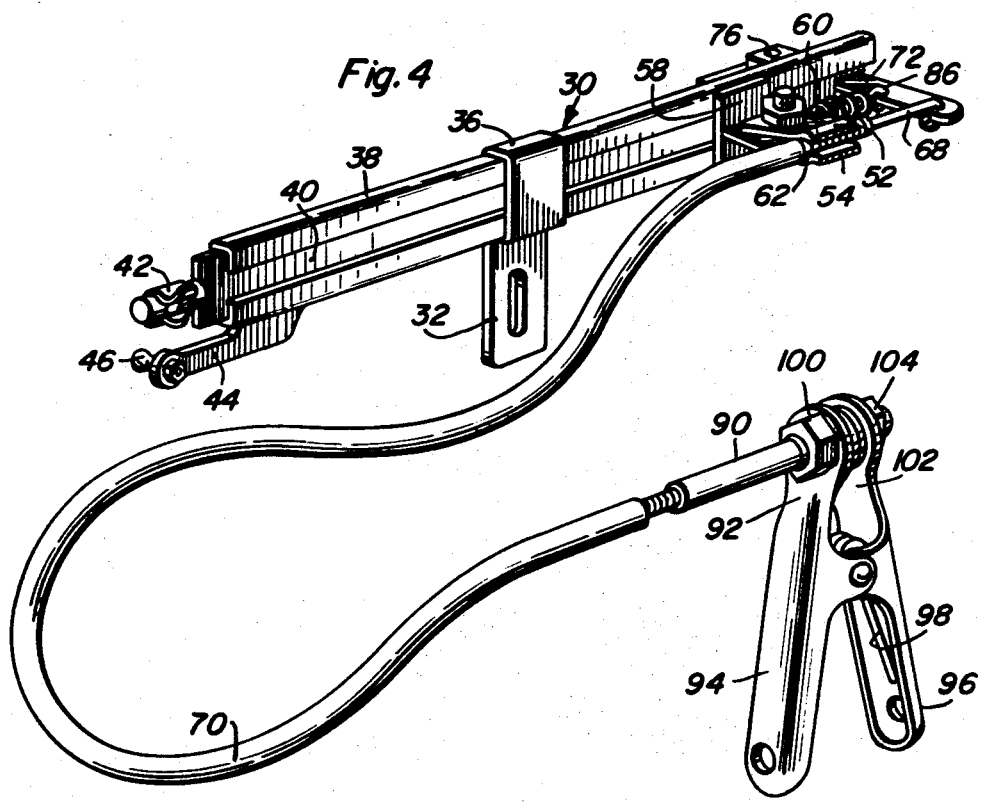
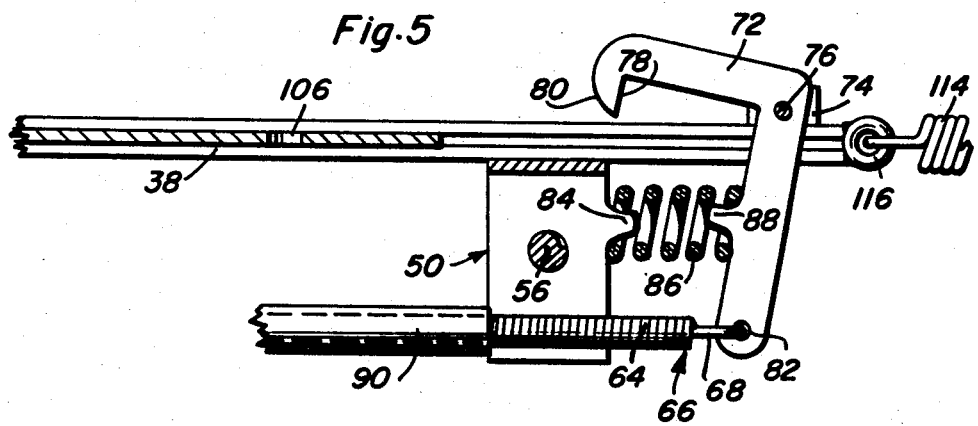
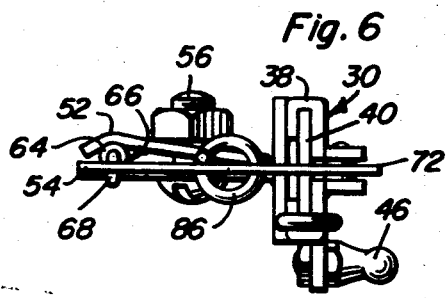
Louis W. McDermott
INVENTOR.

DRIVER TRAINING CAR THROTTLE DISCONNECT

The throttle disconnect of the instant invention has been designed to provide a means whereby the instructor in a driver training car may, whenever he desires, disconnect the foot throttle pedal and its attendant throttle linkage from the throttle valve control arm of the car and allow the throttle linkage control arm to rapidly return to its "idle" position by spring return means.

There are many instances when persons learning to drive an automobile under the direction of an instructor become startled, scared or indecisive resulting in the student "freezing" on the foot throttle. While some driver training cars are provided with additional braking controls for the instructor (and in some instances steering controls) even with the instructor being provided with his own footbrake the stopping distance of a driver training car is appreciably increased if the student has his foot depressed on the accelerator pedal, especially if the driver training car is equipped with an automatic transmission. Further, in some instances driver training cars are not provided with any additional controls for the instructor and thus the instructor does not have adequate means to terminate acceleration of the driver training car should his student "freeze" on the foot throttle.

It is accordingly the main object of this invention to provide a selectively and remotely actuatable control for control by an instructor of a driver training car, or other car or motor vehicle utilized to instruct an operator, and operative, when actuated, to disconnect the foot throttle pedal from control over the throttle valve control arm of the carburetor of the driver training car thus allowing the control arm to be quickly spring biased to its "idle" position.

Another object of this invention, in accordance with the immediately preceding object, is to provide a control of the "override" type including means by which operative connection between the foot accelerator pedal and the carburetor throttle valve control arm may be readily reestablished in a matter of a second or two after the instructor has regained control over the driver training car.

Another important object of this invention is to provide a driver training car throttle disconnect constructed in a manner whereby it may be readily attached to substantially all types of present day driver training cars.

A further object of this invention is to provide a driver training car throttle disconnect including a remotely operable actuator connected to the release portion of the throttle disconnect by means of a flexible bowden cable or the like whereby the actuator for the throttle disconnect may be readily held in one hand of the instructor at all times when he is instructing a pupil for immediate actuation whenever necessary.

A final object of this invention to be specifically enumerated herein is to provide a throttle disconnect in accordance with the preceding objects and which will conform to conventional forms of manufacture, be of simple construction and easy to use so as to provide a device that will be economically feasible, long lasting and trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a perspective view of the complete throttle disconnect;

FIG. 5 is an enlarged fragmentary horizontal sectional view taken substantially upon a plane passing through the central portion of the left end of the throttle disconnect illustrated in FIG. 4 and with the release portion of the throttle disconnect actuated; and FIG. 6 is a rear end elevational view of the throttle disconnect.

Figure 1:
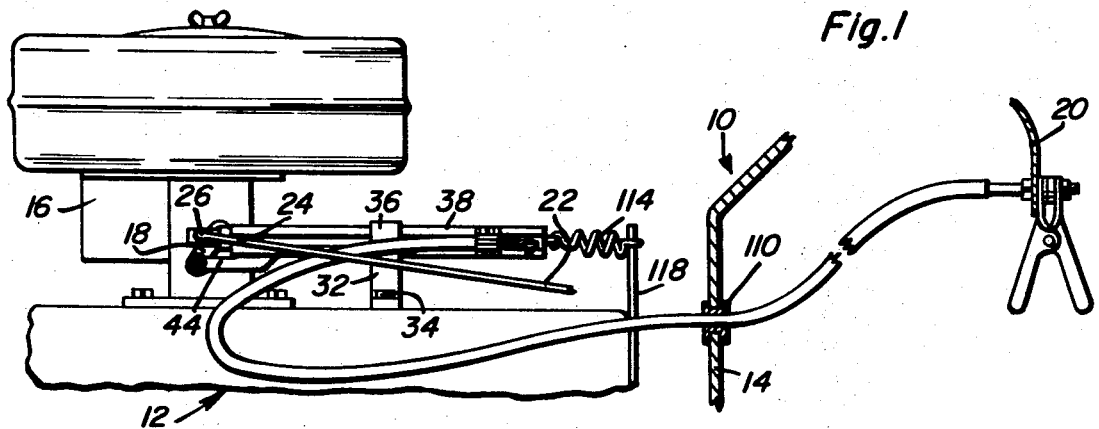
FIG. 1 is a fragmentary schematic view of the engine, firewall and dashboard portions of a driver training car with the throttle disconnect of the instant invention operatively associated with the throttle controls of the engine and with the actuator portion of the throttle disconnect supported from the dashboard of the driver training car.

Referring now more specifically to the drawings, the numeral 10 generally designates a driver training vehicle or other vehicle utilized for the purpose of training a driver. The vehicle 10 includes a conventional internal combustion engine referred to in general by the reference numeral 12 mounted in the vehicle 10 forward of a firewall 14 of the vehicle. The engine 10 includes a carburetor 16 provided with an oscillatable throttle valve control arm 18 and the vehicle 10 further includes a dashboard 20.

In addition, the vehicle 10 includes a throttle linkage rod 22 whose forward end 24 includes a right-angled head 26 which is conventionally swivelly connected to the free end of the arm 18 by means of a quick-disconnect assembly 28 carried by the arm 18. The rear end of the rod 22 is conventionally connected to other throttle linkage components (not shown) actuatable by the floor accelerator or throttle pedal (not shown) of the vehicle 10. The connection between the throttle pedal and the rod 22 is such that when the pedal is depressed the rod 22 will be shifted forwardly to the left as viewed in FIG. 1 of the drawings so as to swing the arm 18 in a clockwise direction toward the full-open position. The arm 18 is illustrated in FIG. 1 of the drawings as swung almost fully to the full-open throttle position.

The throttle disconnect of the instant invention is referred to in general by the reference numeral 30 and includes an upright support 32 whose lower end is secured to the engine 12 by means of any suitable fastener 34 such as a cylinder head or intake manifold bolt. The upper end of the support 32 defines a sleeve portion 36 which is generally rectangular in cross-sectional shape and the throttle disconnect 30 includes a main C-shaped channel slide 38 which is slidingly received through the sleeve portion 36 for longitudinal reciprocation of the channel slide 38 relative to the sleeve portion 36. In addition, the disconnect 30 includes an inner plate-like slide 40 which is slidingly disposed within the channel slide 38 for longitudinal reciprocation relative to the latter. The forward end of the inner plate-like slide 40 includes a quick-disconnect assembly 42 which is similar to the assembly 28 and to which the head 26 of the rod 22 is removably anchored or attached in lieu of the assembly 28. However, the forward end of the channel slide 38 includes a lower forward arm portion 44 on whose forward end a head 46 corresponding to head 26 is secured and the head 46 is removably anchored or secured to the quick-disconnect assembly 28 in lieu of the head 26.

The rear end of the channel slide 38 includes a horizontally outwardly projecting clamp assembly 50 including upper and lower plates 52 and 54 drawn together by means of a threaded fastener 56. The lower plate 54 is stationarily supported from a brace 58 secured to the channel slide 38 and the outer ends of the plates 52 and 54 include opposing semicylindrical recesses 60 and 62 which open toward each other and between which one end of the outer casing or housing 64 of a Bowden cable assembly generally referred to by the reference numeral 66 is clampingly secured. The Bowden cable assembly 66 includes an inner longitudinally shiftable core 68 and an outer tubular protective cover 70 is disposed over the flexible outer housing 64 intermediate its opposite ends.

A bellcrank 72 is pivotally supported from a horizontally outwardly projecting bracket 74 by means of a pivot pin 76 and the bracket 74 is rigidly supported from the outer channel slide 38. One end of the bellcrank 72 includes a laterally projecting tooth 78 including a cam surface 80 and the other end of the bellcrank 72 is apertured as at 82 and has the adjacent end of the core 68 looped through the aperture 82. The lower plate 54 includes a projection 84 over which one end of a compression spring 86 is engaged and the other end of the compression spring 86 is engaged over a projection 88 carried by the bellcrank 72 and opposing the projection 84.

Accordingly, it may be seen that the compression spring 86 biases the bellcrank 72 in a counterclockwise direction as viewed in FIG. 5 of the drawings.

The end of the housing 64 remote from the clamp assembly 50 is secured in a sleeve 90 which is in turn secured through one jaw portion 92 of a pair of pivotally interconnected levers 94 and 96 whose handle portions are spring urged apart by means of a butterfly spring 98. The sleeve 90 is secured through the jaw portion 92 by means of a pair of jamnuts 100 threaded onto the sleeve 90 on opposite sides of the jaw portion 92 and the end of the core 68 remote from the bellcrank 72 is secured through the other jaw portion 102 by means of a fastener 104.

The end of the inner slide 40 adjacent the bellcrank 72 is provided with an aperture 106 in which the tooth or projection 78 is receivable when the slide 40 is shifted rearwardly with its rear end abutted against the transversely extending arm of the bellcrank 72.

The Bowden cable assembly 66 extends from the clamp assembly 50 through a grommet 110 secured through the firewall 14 and the sleeve 90 may be secured through the dashboard 20 with the jaw portion 92 also secured to the dash portion 90 by means of the jamnuts 100. However, if desired, the end of the Bowden cable assembly 66 remote from the clamp assembly 50 may be left free of connection with the dashboard 20 so that the instructor of the driver training car 10 may hold the handle portion 96 of the pivotally connected levers 94 in one hand at all times.

Figure 2:
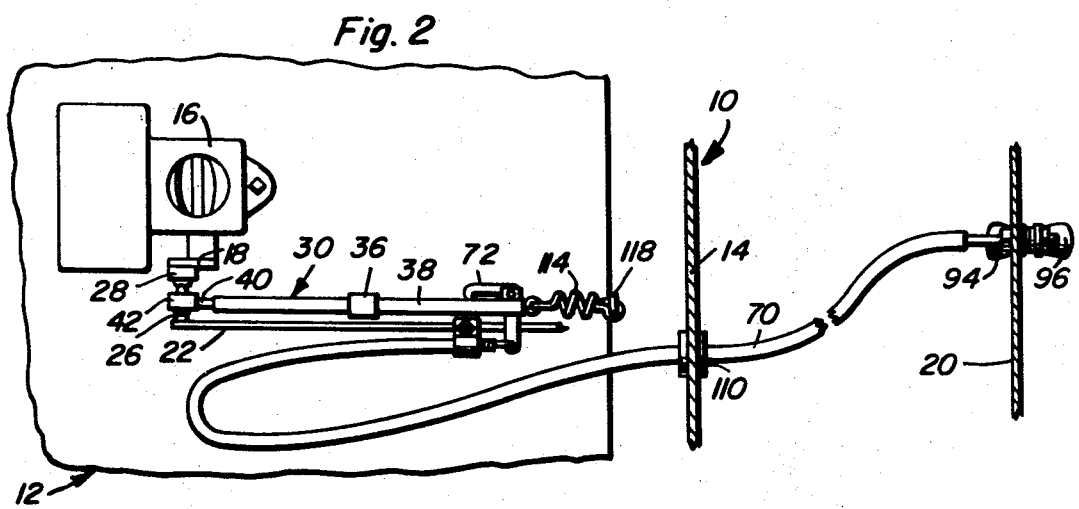
FIG. 2 is a schematic top plan view of the assemblage illustrated in FIG. 1.
Figure 3:
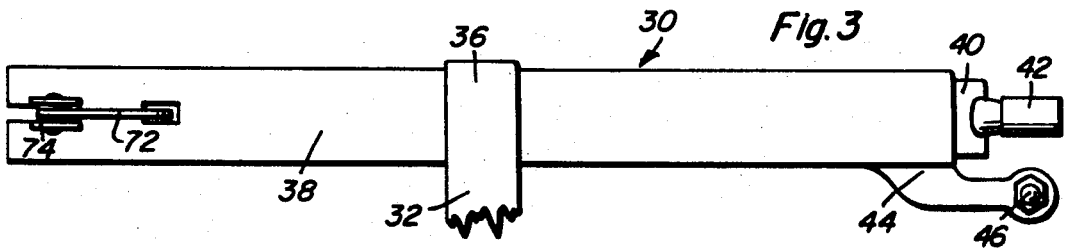
FIG. 3 is a fragmentary side elevational view of the engine-mounted portion of the throttle disconnect as seen from the background of FIG. 1.

In addition to the normal throttle return spring (not shown) connected between the rod 22 and a stationary body portion of the vehicle 10 for yieldingly urging the rod 22 to the right as viewed in FIGS. 1 and 2 of the drawings, the throttle disconnect 30 includes a tension spring 114 having one end anchored to an eye 116 carried by the rear end of the outer channel slide 38 and its other end anchored to a suitable engine-mounted support 118. Accordingly, the tension spring 114 serves to yieldingly bias the channel slide 38 to the right as viewed in FIGS. 1 and 2 of the drawings.

In operation, when installing the throttle disconnect 30, after the Bowden cable assembly 66 has been inserted through the grommet 110, the stand 32 is secured to the engine 12 by means of the fastener 34. Then, the rod 22 is disconnected from the quick-disconnect assembly 28 and anchored to the quick-disconnect assembly 42. In addition, the head 46 is operatively connected to the quick-disconnect assembly 28 in lieu of the rod 22. Thereafter, it is only necessary to connect the tension spring 114. As thus installed, should the student driving the vehicle 10 press the floor mounted accelerated pedal and "freeze" as a result of fear, nervousness or indecision, the instructor within the vehicle needs only to squeeze the handle portion 96 toward each other at which time a pull will be exerted on the adjacent end of the core 68 to swing the bellcrank 72 in a clockwise direction as viewed in FIG. 5 of the drawings so as to withdraw the tooth or projection 78 from the aperture 106. This of course will free the other channel slide 38 which is connected to the throttle valve control arm 18 for rearward shifting relative to the inner slide 40 under the biasing action of the spring 114 so as to move the throttle valve control arm 18 to the idle position. Then, after the instructor has regained control of the vehicle or brought the latter to a stop or standstill, as soon as foot pressure is released from the foot accelerator pedal the conventional return spring for the rod 22 will slide the inner slide 40 rearwardly relative to the outer slide 38 so as to engage the rear end of the slide 40 with a cam surface 80, pivot the tooth 78 in a clockwise direction to an out-of-the-way position enabling continued rearward displacement of the slide 40 under the biasing action of the conventional throttle return spring until the slide 40 has its aperture 106 registered with the tooth or projection 78. Of course, as soon as the tooth or projection 78 is registered with the aperture 106, the compression spring 86 will rotate the bellcrank 72 in a counterclockwise direction to seat the tooth or projection 78 in the aperture 106 thereby again establishing motion-transmitting connection between the slides 38 and 40 and thus between the rod 22 and the arm 18.

The support 32 may be of any suitable configuration so as to adapt the throttle disconnect 30 for support from substantially any internal combustion engine. Therefore, it may be seen that the throttle disconnect 30 may be readily adapted for use on substantially all vehicles which might be utilized for driver training purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. In combination with a throttle control reciprocal along a path in first and second directions to open and closed positions, respectively and a throttle actuator portion also shiftable in a reciprocal manner and normally operatively connected to said control for actuation thereof, a throttle disconnect including first and second sections supported for relative reciprocation, said first section being secured to said throttle control, said second section being secured to said throttle actuator portion, and remotely operable means releasably securing said first and second sections in predetermined relatively shifted positions.

2. The combination of claim 1 including spring means operatively connected to said first section yieldingly urging the latter in said second direction.

3. The combination of claim 1 wherein one of said sections comprises an elongated channel-defining member, the other of said sections being elongated and longitudinally slidably disposed in said channel.

4. The combination of claim 1 wherein said remotely operable means includes a latch member supported from one of said sections for shifting between first and second locked and unlocked positions and a transverse opening formed through said other of said sections, said latch member including a latch portion received in said opening when said sections are in said predetermined relatively shifted positions and said latch member is in said first position, said latch portion being retracted out of said opening when said latch member is in said second position.

5. The combination of claim 4 including spring means yieldingly biasing said latch member to said first position.

6. The combination of claim 5 wherein said remotely operable means includes means operatively connected between said latch member and said one section selectively operable from a location remote from said one section for shifting said latch member to said second position.

7. The combination of claim 1 wherein one of said sections comprises an elongated channel-defining member, the other of said sections being elongated and longitudinally slidably disposed in said channel, said one section comprising said second section.

8. The combination of claim 7 wherein said channel is generally rectangular in cross section.

9. The combination of claim 8 wherein said remotely operable means includes a latch member supported from one of said sections for shifting between first and second locked and unlocked positions and a transverse opening formed through said other of said sections, said latch member including a latch portion received in said opening when said sections are in said predetermined relatively shifted positions and said latch member is in said first position, said latch portion being retracted out of said opening when said latch member is in said second position.

10. The combination of claim 9 including spring means yieldingly biasing said latch member to said first position.